US012724189B2

(12) United States Patent
Song et al.

(10) Patent No.: US 12,724,189 B2
(45) Date of Patent: Sep. 1, 2026

(54) IMAGING MODULE, ASSEMBLING METHOD THEREFOR, AND HEAD MOUNT DISPLAY

(71) Applicant: Goertek Optical Technology Co., Ltd., Weifang (CN)

(72) Inventors: Wenbao Song, Shandong (CN); Shu Guan, Shandong (CN); Tonglei Zhao, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 302 days.

(21) Appl. No.: 18/575,588

(22) PCT Filed: Jun. 21, 2022

(86) PCT No.: PCT/CN2022/100047

§ 371 (c)(1),
(2) Date: Dec. 29, 2023

(87) PCT Pub. No.: WO2023/273949

PCT Pub. Date: Jan. 5, 2023

(65) Prior Publication Data

US 2025/0264650 A1 Aug. 21, 2025

(30) Foreign Application Priority Data

Jun. 30, 2021 (CN) ......................... 202110740120.5
Dec. 1, 2021 (CN) ......................... 202111460503.3

(51) Int. Cl.
*G02B 27/01* (2006.01)
*G02B 5/30* (2006.01)

(52) U.S. Cl.
CPC ....... *G02B 5/3083* (2013.01); *G02B 27/0172* (2013.01); *G02B 2027/0118* (2013.01)

(58) Field of Classification Search
CPC .............. G02B 5/3083; G02B 27/0172; G02B 27/286; G02B 2027/0118
USPC ..................................................... 359/489.07
See application file for complete search history.

(56) References Cited

U.S. PATENT DOCUMENTS 6,094,181 A * 7/2000 Hildebrand .......... H04N 5/7491 348/E5.145
9,952,371 B2 * 4/2018 Ambur ................. G02B 5/3041
12,216,275 B2 * 2/2025 Yamada ............... G02B 5/3033
12,345,872 B2 * 7/2025 Yun .................... G02B 27/0025
2017/0068096 A1 * 3/2017 Ouderkirk ........... G02B 27/283
(Continued)

FOREIGN PATENT DOCUMENTS

CN 106501881 A 3/2017
CN 106501881 B 3/2017
(Continued)

*Primary Examiner* — William R Alexander
(74) *Attorney, Agent, or Firm* — Baker Botts LLP

(57) ABSTRACT

Disclosed are an imaging module, an assembling method therefor, and a head mount display. The imaging module includes: a display screen, an imaging lens, and a first polarization converter. The display screen is configured for emitting a light. The imaging lens is provided in a light-emergent direction of the display screen. The first polarization converter is provided on the imaging lens; lights emitted by the display screen in different fields of view include chief lights located in the center which all pass through a central region of an exit pupil position.

10 Claims, 5 Drawing Sheets

(56) References Cited

U.S. PATENT DOCUMENTS

| | | | | |
|---|---|---|---|---|
| 2017/0146714 | A1* | 5/2017 | Ambur | G02B 27/0172 |
| 2018/0120567 | A1* | 5/2018 | Cobb | G02B 27/0172 |
| 2019/0384045 | A1* | 12/2019 | Yun | G02B 27/0172 |
| 2023/0324669 | A1* | 10/2023 | Yun | G02B 5/3033<br>359/630 |
| 2024/0134187 | A1* | 4/2024 | Yamada | G02B 5/3033 |

FOREIGN PATENT DOCUMENTS

| | | | |
|---|---|---|---|
| CN | 110161699 | A | 8/2019 |
| CN | 110383135 | A | 10/2019 |
| CN | 212658889 | U | 3/2021 |
| CN | 113391452 | A | 9/2021 |
| CN | 114047633 | A | 2/2022 |
| CN | 114047633 | B | 2/2022 |
| WO | WO2020/240354 | A1 | 12/2020 |

* cited by examiner

IMAGING MODULE, ASSEMBLING METHOD THEREFOR, AND HEAD MOUNT DISPLAY

CROSS-REFERENCE TO RELATED APPLICATIONS

The present disclosure is a National Stage of International Application No. PCT/CN2022/100047, filed on Jun. 21, 2022, which claims priority to Chinese patent application No. 202110740120.5, filed on Jun. 30, 2021 and entitled "IMAGING MODULE, ASSEMBLING METHOD THEREFOR AND HEAD MOUNT DISPLAY", and claims priority to Chinese patent application No. 202111460503.3, filed on Dec. 1, 2021, which are incorporated herein by reference in their entireties.

TECHNICAL FIELD

The present disclosure relates to the field of optical display technology, and in particular to an imaging module, an assembling method therefor and a head mount display.

BACKGROUND

In a head mount display (HMD), in order to reduce the volume of the whole device, a catadioptric optical path is usually designed inside the head mount display, so that light is propagated back and forth many times in a limited space. In order to ensure that the light can be refracted and reflected smoothly, the light needs to be converted to a uniform polarization state. However, when the light from the display screen passes through some optical elements, its incident angle changes, and different incident angles will cause light to be converted into different polarization states. These lights in different states other than the uniform polarization state form stray light, which may degrade the clarity of imaging.

SUMMARY

In view of the above, aiming at the problem that the stray light, which is formed by the existing lights in different incident angles, may degrade clarity of imaging, it is necessary to provide an imaging module, an assembling method therefor and a head mount display intended for reducing the stray light and ensuring users a clear imaging picture.

To achieve the above objective, the present disclosure proposes an imaging module, comprising:

a display screen configured for emitting a light;

an imaging lens provided in a light-emergent direction of the display screen; and a first polarization converter provided on the imaging lens, lights emitted by the display screen in different fields of view comprise chief lights located in the center which all pass through a central region of an exit pupil position.

Optionally, incident angles of the chief lights emitted by the display screen in different fields of view to a surface of the first polarization converter are less than or equal to 5°.

Optionally, the chief lights comprise a central chief light emitted from a central field of view of the display screen and a marginal chief light emitted from a marginal field of view of the display screen, an incident angle of the central chief light first incident to the first polarization converter is a first central incident angle being $\alpha 1$, satisfying $\alpha 1=0$;

an incident angle of the marginal chief light first incident to the first polarization converter is a first marginal incident angle being $\beta 1$, satisfying $0° \leq \beta 1 \leq 5°$.

Optionally, the imaging lens is provided with a light-incident surface to which the light is incident and a light-emergent surface from which the light is emergent, and the first polarization converter is provided on the light-incident surface or on the light-emergent surface of the imaging lens.

Optionally, the imaging module further comprises a second polarization converter provided on the light-emergent surface of the imaging lens, the first polarization converter is provided on the light-incident surface of the imaging lens, and both the light-incident surface and the light-emergent surface of the imaging lens are flat surfaces;

an incident angle of the central chief light first incident to the second polarization converter is a second central incident angle being $\alpha 2$, satisfying $\alpha 2=0$;

an incident angle of the marginal chief light first incident to the second polarization converter is a second marginal incident angle being $\beta 2$, satisfying $0° \leq \beta 2 \leq 5°$.

Optionally, the imaging lens comprises a first lens and a second lens which are sequentially provided along a light propagation direction, are made of the same material and are glued to each other; the first polarization converter is provided on a light-incident surface of the first lens, and the second polarization converter is provided on a light-emergent surface of the second lens.

Optionally, the first polarization converter and the second polarization converter are both phase retarders, and the imaging module further comprises:

a linear polarizer provided on a side of the first polarization converter facing away from the first lens;

a beam-splitter provided between the first lens and the second lens, and a polarization reflector provided on a side of the second polarization converter facing away from the second lens.

Optionally, the imaging module further comprises a third polarization converter which is a phase retarder and is provided between the linear polarizer and the display screen.

Optionally, the imaging module further comprises a third lens which is a positive lens and is provided on a side of the imaging lens facing away from the display screen;

a direction perpendicular to a direction of an optical axis of the imaging module is defined as a height direction, the imaging module has a height of D1, and the third lens has a height of D2, satisfying: $D2<D1$.

In addition, for solving the above problem, the present disclosure also provides an assembling method for an imaging module, the assembling method is applied for the above imaging module, the first polarization converter is glued to the imaging lens, and the assembling method comprises:

adjusting a gluing angle of the first polarization converter on the imaging lens so as to determine a gluing position of the first polarization converter when stray light is at a low ebb; and gluing and fixing the first polarization converter according to determined gluing position of the first polarization converter.

In addition, for solving the above problem, the present disclosure also provides a head mount display, wherein the head mount display comprises a housing and the above imaging module, and the imaging module is provided within the housing.

In the technical solution proposed in the present embodiment, the display screen emits light to the imaging lens. The imaging lens is used to transmit the light of the display screen and perform imaging at exit pupil position via the human eye. The first polarization converter is used to change the polarization state of the light. The chief lights of the display screen under different fields of view pass through the center of the exit pupil position, and as such it is understood that the imaging module is understood to be an image side telecentric system, and that the chief lights emitted under different fields of view are parallel or substantially parallel to each other. Thus, the chief lights emitted from the display screen at different positions have a smaller incident angle on the surface of the first polarization converter. In this case, it is possible to ensure that the incident angles are as uniform as possible, to reduce the occurrence of other incident angles, and thus to reduce occurrence of lights in other polarization states, which in turn reduces occurrence of the stray light, and ensures that the user obtains a clear imaging picture.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DESCRIPTION OF REFERENCE SIGNS

Figure 1:
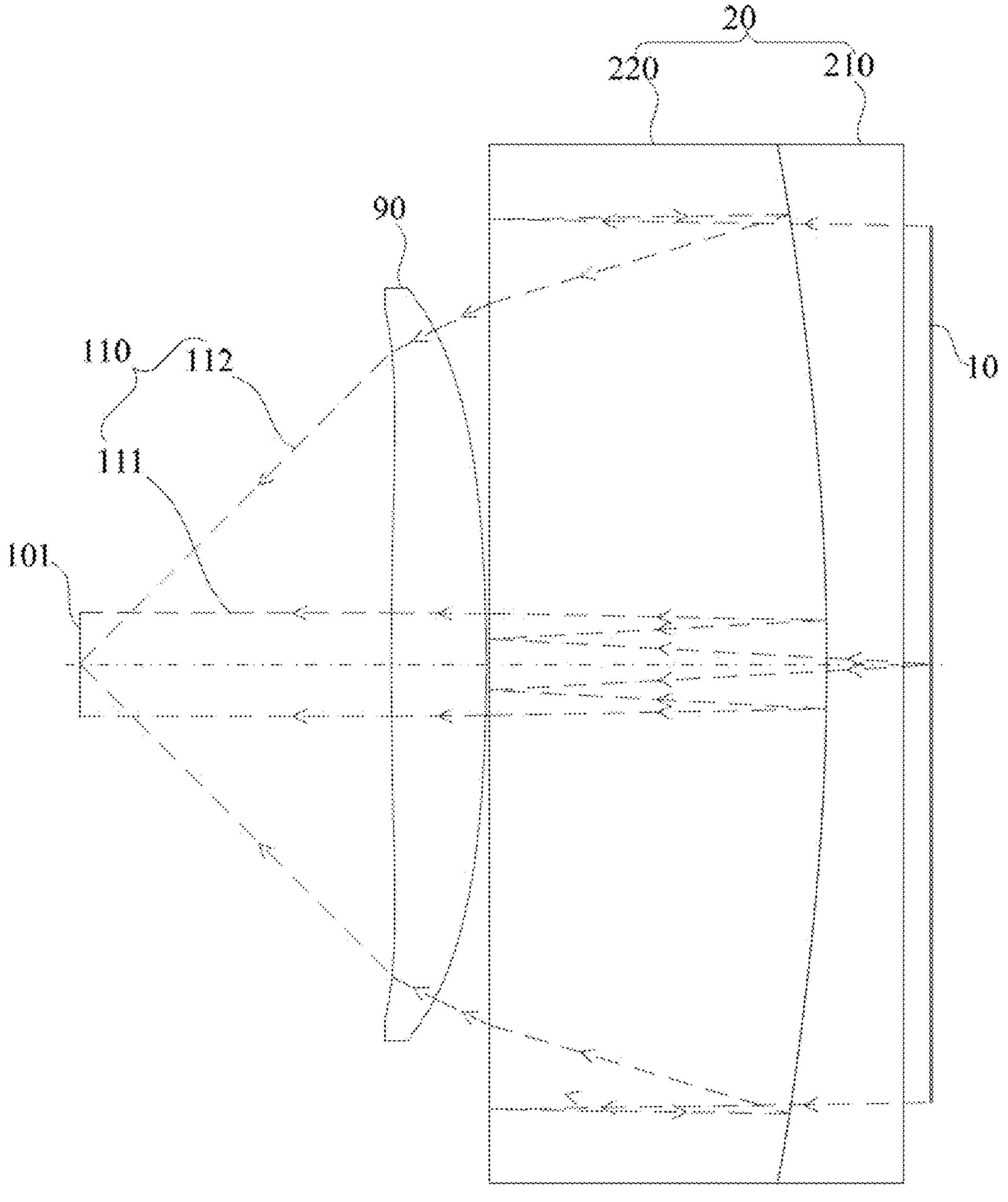
FIG. 1 shows a schematic structural illustration of an optical module in an embodiment of the present disclosure.

| No. | Name | No. | Name |
|---|---|---|---|
| 10 | display screen | 30 | first polarization converter |
| 101 | human eye | 40 | second polarization converter |
| 110 | chief light | 50 | linear polarizer |
| 111 | central chief light | 60 | beam-splitter |
| 112 | marginal chief light | 70 | polarization reflector |
| 20 | imaging lens | 80 | third polarization converter |
| 210 | first lens | 90 | third lens |
| 220 | second lens | | |

The implementation of the objects, functional features and advantages of the present disclosure will be further described in connection with the embodiments, with reference to the accompanying drawings.

DETAILED DESCRIPTION

Technical solutions in the embodiments of the present disclosure are described below with reference to the accompanying drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

It should be noted that all directional indications (such as up, down, left, right, front, back . . . ) in the embodiment of the present disclosure are used only to explain the relative positional relationship, movement, etc., between the parts in a particular attitude (as shown in the accompanying drawings), and the directional indications are changed accordingly if that particular attitude is changed.

In addition, terms “first” and “second” involved in the present disclosure are only used for descriptive purposes and should not be understood as indicating or implying relative importance or implying a number of indicated technical features. Therefore, a feature delimited with “first”, “second” may expressly or implicitly include at least one of those features. In a description of the present disclosure, “a plurality” means at least two, such as two, three, etc., unless expressly and specifically defined otherwise.

In the present disclosure, unless expressly specified and limited otherwise, terms “connected”, “fixed” and other terms should be interpreted in a broad sense, for example, it can be a fixed connection, a detachable connection, or an integrated; it can be a mechanical connection or an electrical connection; it can be directly connected, or indirectly connected through an intermediate medium, and it can be an internal communication between two elements or an interaction relationship between the two elements, unless otherwise explicitly defined. For those of ordinary skill in the art, specific meanings of the above terms in the present disclosure can be understood according to specific situations.

In addition, the technical solutions between the various embodiments of the present disclosure may be combined with each other, but it must be based on the fact that it can be realized by a person of ordinary skill in the art. When the combination of technical solutions appears to be contradictory or unattainable, it should be considered that such combination of technical solutions does not exist and is not within the scope of protection claimed in the present disclosure.

In related technology, the head mount device may provide a virtualized experience for the user, but the current head mount devices are large in size, and in order to reduce the volume of the head mount device, a catadioptric optical path is usually designed inside the head mount display, so that light is transmitted back and forth many times in a limited space. At the same time, in order to ensure that the light can be refracted and reflected smoothly, the light needs to be converted to a uniform polarization state. However, when the light from the display screen passes through some optical elements, its incident angle will change, in particularly when passing through some polarization converters, and different incident angles will lead to light into different polarization states. These lights in a different state than the uniform polarization state form stray light, which may degrade the clarity of imaging.

Figure 2:
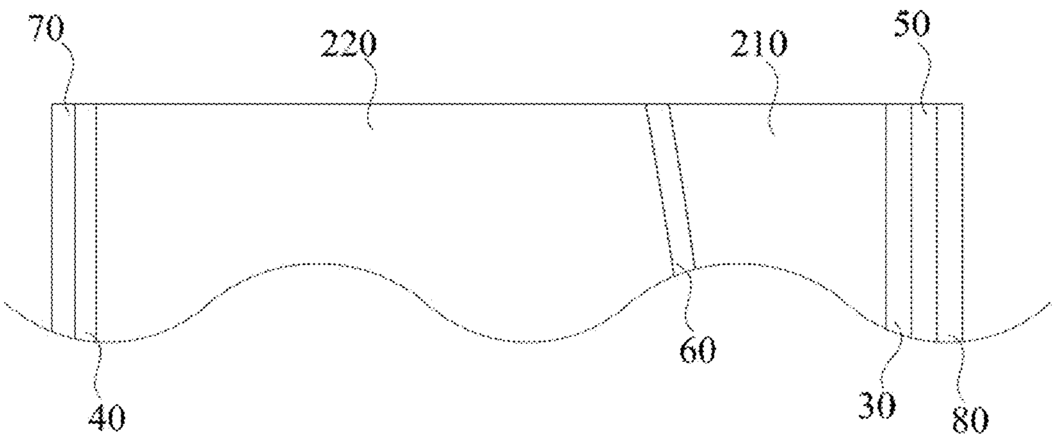
FIG. 2 is a schematic structural illustration of a portion of the imaging lens in FIG. 1.
Figure 3:
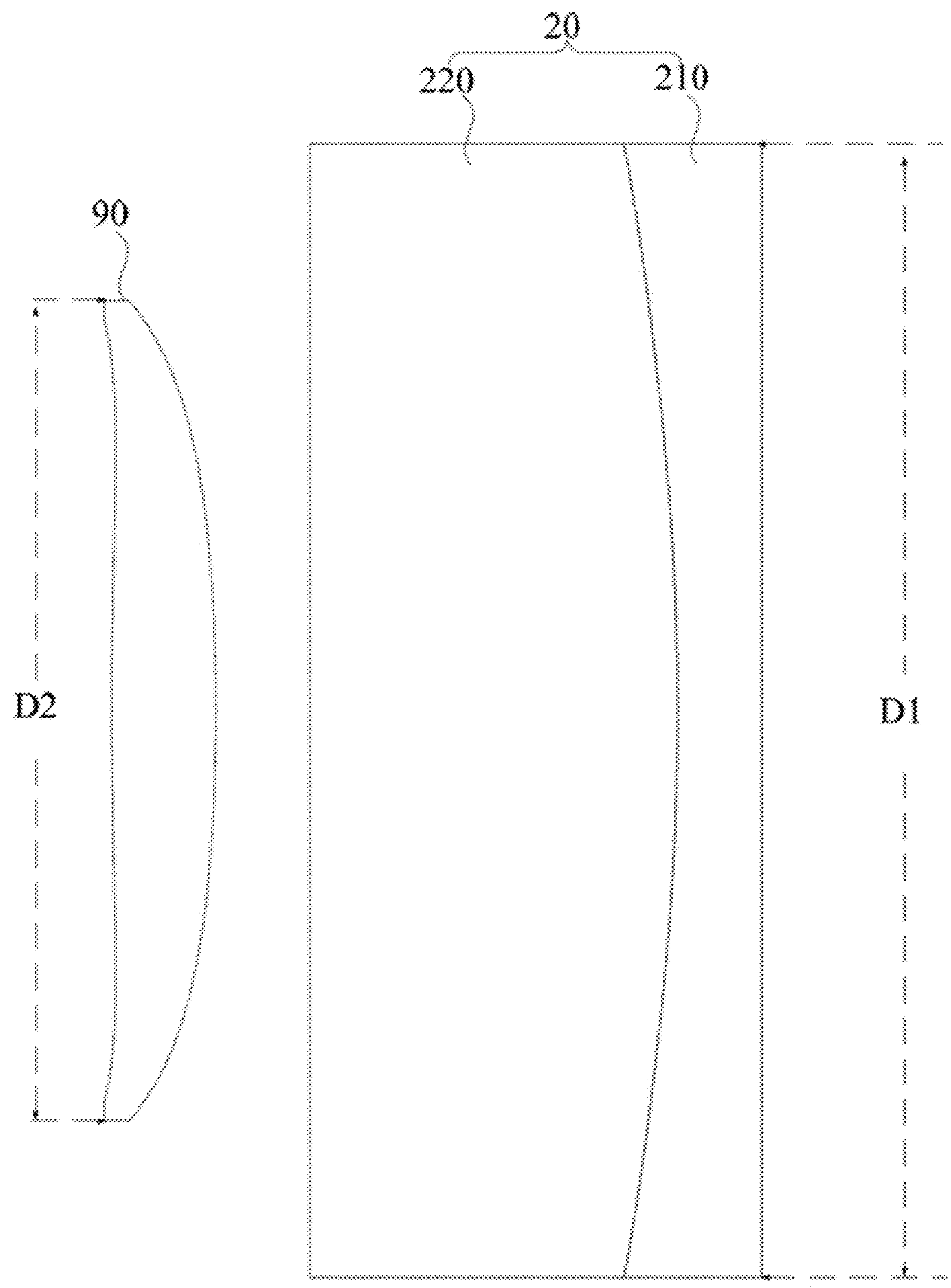
FIG. 3 is a schematic diagram of the heights of the imaging lens and the third lens in FIG. 1.

For solving the above problem, please refer to FIGS. 1 and 2, the present disclosure provides an imaging module, which comprises a display screen 10, an imaging lens 20 and a first phase retarder 30. The display screen 10 is configured for emitting light, the imaging lens 20 is provided in a light-emergent direction of the display screen 10, the first polarization converter 30 is provided on the imaging lens 20, the imaging lens 20 is provided with a light-incident surface and a light-emergent surface, and the first polarization converter 30 is provided on the light-incident surface or on the light-emergent surface of the imaging lens 20.

Here, the display screen 10 comprises pixel points arranged in rows and columns, each of which is a light emitting unit. The light emitted from the light emitting units forms a conical diffused light which comprises a chief light 110 emitted from the center of each light emitting unit and an auxiliary light located at the periphery of the chief light 110 and having a weak light intensity. The chief light 110 occupies most of the light intensity of the diffused light, and controls the incident angle of the chief light 110, which is equivalent to controlling the incident angle of all the lights of the display screen. In this way, the incident angle of the chief light 110, and thus of the entire light, is guaranteed. In addition, the display screen 10 includes a variety of display principles. For example, the principle of the display screen 10 includes LCD (Liquid Crystal Display), or LED (ray Emitting Diode), OLED (Organic Light-Emitting Diode), Micro-OLED (Micro-Organic Light-Emitting Diode), ULED (Ultra). Light Emitting Diode), or DMD (Digital Micromirror Device), etc.

The imaging lens 20 is provided in a light-emergent direction of the display screen 10, and functions to magnify and resolve the light. The area of the light-emergent surface of the display screen 10 is small, e.g., a few inches in size in a VR (Virtual Reality) display device or an AR (Augmented Reality) display device. In order to ensure that the user obtains a magnified display picture, the light needs to be magnified and the user is ensured by the imaging lens 20 to obtain a magnified picture that can be recognized. Wherein the imaging lens 20 may be a single lens or a combination of multiple lenses.

The first polarization converter 30 is provided on the imaging lens 20, and functions to change polarization state of the light, e.g., to convert the light to linearly polarized light, or to convert the light to circularly polarized light, or to elliptically polarized light, and also to convert the polarization state of the light between the linearly polarized state and the circularly polarized state. The light passes through the imaging lens and converges to form an image after passing through the human eye at the exit pupil position, and the light emitted by the display screen under different fields of view comprises chief lights 110 at the center, which all pass through the central region of the exit pupil position. Ideally, the chief lights 110 pass through the center point of the exit pupil position, i.e., the chief lights 110 pass through one point. It is also possible that the chief lights 110 pass through a circular central region centered on the center point of the exit pupil position and formed with a certain radius value. For example, the central region is a circular region formed by taking the center point of the exit pupil position as a circular point and taking one fifth of the height of the exit pupil image as a radius. The chief lights passing through the central region are substantially perpendicular to the surface of the first polarization converter 30. The first polarization converter 30 may be independent optical elements or a film structure, and is bonded to the imaging lens 20 through an optical adhesive.

In the technical solution proposed in the present embodiment, the display screen 10 emits light to the imaging lens 20. The imaging lens 20 is used to transmit the light of the display screen 10 and converge it at the position of the human eye 101. The first polarization converter 30 is used to change the polarization state of the light. The chief lights 110 of the display screen 10 under different fields of view pass through the center of the exit pupil position, and as such it is understood that the imaging module is understood to be an image side telecentric system, and that the chief lights 110 emitted under different fields of view are parallel or substantially parallel to each other. Thus, the chief lights 110 emitted from the display screen 10 at different positions have a smaller incident angle on the surface of the first polarization converter 30. In this case, it is possible to ensure that the incident angles are as uniform as possible, to reduce the occurrence of other incident angles, and thus to reduce occurrence of lights in other polarization states, which in turn reduces occurrence of the stray light, and ensures that the user obtains a clear imaging picture.

In the above embodiment, in order to further limit the incident angle of the chief light and reduce the generation of the spray light, the incident angle of the chief light 110 emitted from the display screen at different positions on the surface of the first polarization converter is less than or equal to 5°, and specifically, the incident angle is between 0° and 5°, for example, the incident angle may be 0°, 1°, 2°, 3°, 4° and 5°, or may be a decimal value of incident angle. As can be seen, the chief lights 110 are substantially parallel to each other, and even at the edge position of the display screen, the tilt angle of the chief lights 110 is small, and the forward direction of the chief lights 110 is substantially orthogonal to the surface of the first polarization converter, so as to reduce the generation of the stray light.

In the above embodiment, the light is more likely to be diffused at the edge position of the display screen 10, and thus the light at the edge position is more likely to form a stray light. For further reducing the stray light, the chief lights 110 comprise a central chief light 111 emitted from a central field of view of the display screen 10 and a marginal chief light 112 emitted from a marginal field of view of the display screen 10, an incident angle of the central chief light 111 first incident to the first polarization converter 30 is a first central incident angle being $\alpha 1$, satisfying $\alpha 1=0$. It can be seen that the central chief light 111 is vertically incident to the first polarization converter. The light also comprises a marginal chief light 112 emitted at an edge position of the display screen 10. An incident angle of the marginal chief light 112 first incident to the first polarization converter 30 is a first marginal incident angle being $\beta 1$, satisfying $0° \leq \beta 1 \leq 5°$. For example, $\beta 1$ of the first marginal incident angle may be 0°, 1°, 2°, 3°, 4° and 5°, or may be a decimal angle value. That is to say, for reducing stray light, the light emitted at edge position of the display screen 10 is between 0° and 5°. The first marginal incident angle is within the range of the angle, and by the first marginal incident angle being equal to 0° or close to 0° so as to reduce lights incident at other angles, it is guaranteed that lights passing through the first polarization converter 30 have the same or similar polarization state, thereby reducing the stray light. It should be noted that the display screen 10 has an upper end and a lower end, and with the optical axis of the display screen 10 as the center, if a light emitted from the upper end of the display screen 10 has a positive incident angle at the surface of the first polarization converter 30, then a light emitted from the lower end of the display screen 10 has a negative incident angle at the surface of the second polarization converter 40. It can be understood that the incident angle of the light emitted from the upper end of the display screen 10 is between 0° and 5°, and the incident angle of the light emitted from the lower end of the display screen 10 is between 0° and −5°. Since the lights emitted from the display screen 10 are substantially parallel to their optical axis, the lights are theoretically focused at a farther position, and therefore, an optical system of the imaging module is formed, which is also referred to as an image side telecentric system.

In an embodiment of the present disclosure, to make the position of the first polarization converter 30 more flexible, the imaging lens 20 is provided with a light-incident surface to which the light is incident and a light-emergent surface from which the light is emergent, and the first polarization converter 30 is provided on the light-incident surface or on the light-emergent surface of the imaging lens 20. It should be noted that both the light-incident surface and the light-emergent surface of the imaging lens 20 are flat surfaces, and the first polarization converter 30 is provided on either of them. The central chief light 111 is passed between two parallel flat surfaces, and the incident angle is not deflected. The first polarization converter 30 is provided on the light-incident surface of the imaging lens 20 and is closer to the display screen 10. At this time, the divergence angle of the light is smaller, and it is easier to reduce stray light. The first polarization converter 30 is provided on the light-emergent surface of the imaging lens 20, and lights are incident to the first polarization converter 30 after passing through the imaging lens 20, such that the light resolved by the imaging lens 20 is incident to the first polarization converter 30.

In another embodiment of the present disclosure, sometimes it is necessary to convert the polarization state of the light several times within the imaging module. The imaging module further comprises a second polarization converter 40 provided on the light-emergent surface of the imaging lens 20, the first polarization converter 30 is provided on the light-incident surface of the imaging lens 20; both the light-incident surface and the light-emergent surface of the imaging lens 20 are flat surfaces, with which it is possible to further ensure that the surface of the first polarization converter and the surface of the second polarization converter are perpendicular to the optical axis. By setting the first polarization converter 30 and the second polarization converter 40, the polarization state of the light may be converted at least twice. In addition, in order to ensure that the generation of stray light on the surface of the second polarization converter 40 is also reduced, the central chief light 111 emitted from the display screen 10 is emitted to the second polarization converter 40 after passing through the first polarization converter 30, the incident angle of the central chief light 111 first incident to the second polarization converter 40 is a second central incident angle being $\alpha 2$, satisfying $\alpha 2=0$; the incident angle of the marginal chief light 112 first incident to the second polarization converter 40 is a second marginal incident angle being $\beta 2$, satisfying $0° \leq \beta 2 \leq 5°$. For example, $\beta 2$ of the second marginal incident angle may be 0°, 1°, 2°, 3°, 4° and 5°, or may be a decimal angle value. The mounting position of the second polarization converter 40 on the imaging lens 20 is also a flat surface, whereby the central chief light 111, after being vertically incident on the light-incident surface of the imaging lens 20, is vertically emitted from the light-emergent surface of the imaging lens 20, and in turn, the incident angle of central chief light 111 at the second polarization converter 40 is also zero degree, that is, the second central incident angle $\alpha 2$ is zero degrees. In the case of zero degrees, it is possible to ensure that the lights form a uniform polarization state and reduce the stray light. In addition, when the marginal chief light 112 also passes through two optical axes perpendicular to the display screen 10 in turn, the incident angle of the marginal chief light 112 changes only slightly or nothing, and the incident angle of the marginal chief light 112 is closer to 0°, thus reducing generation of stray light.

To further ensure that the light has the same incidence angles at the light-incident surface and the light-emergent surface of the imaging lens 20, the imaging lens 20 comprises a first lens 210 and a second lens 220 which are sequentially provided along a light propagation direction and are made of the same material, e.g., both are glass or both are plastic. The first lens 210 and the second lens 220 are glued to each other, the first polarization converter 30 is provided on a light-incident surface of the first lens 210, and the second polarization converter 40 is provided on a light-emergent surface of the second lens 220. In the case where the first lens 210 and the second lens 220 are made of the same material, the first lens 210 and the second lens 220 have the same refractive index, and the transmission of light in the first lens 210 is the same as that in the second lens 220, thereby ensuring that the light has the same incident angle at the light-incident surface of the first lens 210 and the light-emergent surface of the second lens 220. In addition, it should be noted that in order to magnify and resolve the light from the display screen 10, it is also possible to set the light-emergent surface of the first lens 210 as a concave surface and set the light-incident surface of the second lens 220 as a convex surface, and thus the lights diverge as they pass the light-emergent surface of the first lens 210 and converge as they pass the light-incident surface of the second lens 220. The original parallel lights are parallel again after the process of divergence and re-convergence, the incident angle does not change, but the diameter of the optical path is increased, so that the user can obtain the magnified image.

In another embodiment of the present disclosure, in order to reduce the size of the imaging module, the first polarization converter 30 and the second polarization converter 40 are both phase retarders, e.g., the first polarization converter 30 and the second polarization converter 40 are quarter waveforms. The imaging module further comprises: a linear polarizer 50, a beam-splitter 60 and a polarization reflector 70. The linear polarizer 50 is provided on a side of the first polarization converter 30 facing away from the first lens 210; the beam-splitter 60 is provided between the first lens 210 and the second lens 220, and can be adhesive or coated. The beam-splitter 60 may be provided on the first lens 210 or on the second lens 220. The polarization reflector 70 is provided on a side of the second polarization converter 40 facing away from the second lens 220. The transmission axis of the linear polarizer 50 is orthogonal to that of the polarization reflector 70, the included angles between the optical axes of the first polarization converter 30 and the second polarization converter 40 and the transmission axis of the linear polarizer 50 are 45°, and the optical axis of the first polarization converter 30 is orthogonal to the that of the second polarization converter 40. The display screen 10 emits light, the emitted light passes through the linear polarizer 50 and the first polarization converter 30 in turn, the polarization state of the emitted light is circularly polarized light, and the light, after passing through the first lens 210, is then directed at the beam-splitter 60. When passing through the beam-splitter 60, a part of the light is reflected while the other part of the light is transmitted. The ratio of reflection to transmission may be 1:1, 2:1, or 1:2. For example, the beam-splitter 60 may be a polarization-reflecting film. The light transmitted through the beam-splitter 60 continues to propagate and passes through the second lens 220 to the second polarization converter 40, where the circularly polarized light changes in polarization state and is converted to a linearly polarized light. The linearly polarized light is directed to the polarization reflector 70. At this time, the vibrating direction of the linearly polarized light is different from the direction of the transmittance axis of the polarization reflector 70, and therefore the light is reflected. The reflected light passes through the second polarization converter 40 and the second lens 220 in sequence, and is directed to the beam-splitter 60 again. When the light passes through the beam-splitter 60 again, the light is partially reflected toward the second polarization converter 40. At this time, the light is converted to circularly polarized light, changes in polarization handedness after reflection, and is converted again to linearly polarized light after passing through the second polarization converter 40 again. At this time, the polarization direction of the linearly polarized light is the same as the direction of the transmission axis of the polarization reflector 70, and in this process, the diameter of the optical path is continuously magnified. Through multiple refractions and reflections of the light, the image is magnified and transmitted in a limited space, which advantageously reduces the volume of the imaging module.

In one of embodiments of the present disclosure, in order to further reduce stray light, the imaging module further comprises a third polarization converter 80 which is a phase retarder, e.g., the third polarization converter 80 is a quarter wave plate. The third polarization converter 80 is provided between the linear polarizer 50 and the display screen 10, and the optical axis thereof and the transmission axis of the linear polarizer 50 form an angle of 45° therebetween, which may be positive 45° or negative 45°. The 45° is to ensure that the light may be switched between circular and linear polarization. The light reflected by the linear polarizer 50 is converted into the circularly polarized light after passing through the third phase retarder and is changed in the polarization handedness after being reflected by the display screen 10 from left-handed to right-handed or from right-handed to left-handed. After the light passes through the third phase retard again, the circularly polarized light is converted into the linearly polarized light, and the polarization direction of the linearly polarized light is perpendicular to the transmission axis of the linear polarizer 50, so that the light cannot pass through the linear polarizer 50, thereby reducing the generation of stray light.

In one of embodiments of the present disclosure, the imaging module further comprises a third lens 90 which is a positive lens and is provided on a side of the imaging lens 20 facing away from the display screen 10; a direction perpendicular to a direction of an optical axis of the imaging module is defined as a height direction, the imaging module 20 has a height of D1, and the third lens 90 has a height of D2, satisfying: D2<D1. It can be seen that the effective height dimension of the third lens 90 is smaller than the effective height dimension of the imaging lens 20. In this way, light needs to be bent at a large angle in the direction of the optical axis of the imaging module when directed to the third lens 90. Also, since the third lens 90 has a positive optical power, the position where the light is converged is closer to the imaging module, and thus, the imaging position is closer. The imaging module has a more compact overall size and is also user-friendly.

Figure 4:
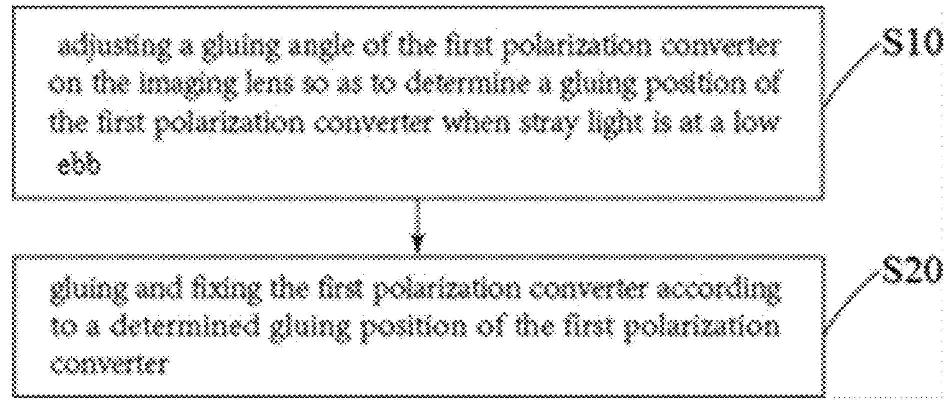
FIG. 4 is a schematic diagram of steps of an assembling method of the imaging module of the present application.

Referring to FIG. 4, the present disclosure also provides an assembling method for an imaging module, the assembling method is applied for the above imaging module, the first polarization converter is glued to the imaging lens, and the assembling method comprises:

Step S10, adjusting a gluing angle of the first polarization converter on the imaging lens so as to determine a gluing position of the first polarization converter when stray light is at a low ebb; providing an optical adhesive between the first polarization converter and the imaging lens, rotating the first polarization converter when the optical adhesive is not cured, wherein the optical axis of the first polarization converter also moves synchronously during the rotation, and finding the position of the first polarization converter when the stray light is minimum by observing the change of the stray light, and recording the position. In addition to observation, it is also possible to set the light intensity threshold of the stray light, and if it is below the light intensity threshold, it means that the stray light is weak, which thus does not degrade the clarity of the imaging.

Step S20, gluing and fixing the first polarization converter according to determined gluing position of the first polarization converter. After the position is determined and the optical adhesive on the first polarization converter is cured by air drying or ultraviolet drying, the fixation of the first polarization converter is completed. In addition, it should be noted that if the first polarization converter is provided on the light-incident surface of the imaging lens, then the second polarization converter may be set on the light-emergent surface of the imaging lens, and when the gluing position of the first polarization converter and the second polarization converter is adjusted, it is possible to simultaneously rotate the first polarization converter and the second polarization converter and find the best position for reducing the stray light between the two, followed by curing.

The embodiment of the assembling method for the imaging module of the present disclosure may refer to each embodiment of the above-mentioned imaging module, and will not be repeated herein.

The present disclosure also provides a head mount display which comprises a housing and the above imaging module, and the imaging module is provided within the housing. The housing provides a mounting space to support the imaging module, and the imaging module is provided within the housing so as to prevent water vapor or dust from the external environment from falling into the interior of the imaging module.

The embodiment of the head mount display in the present disclosure may refer to each embodiment of the above-mentioned imaging module, and will not be repeated herein.

In the above embodiment, there are at least two cases where the imaging lens is provided, the first case being that the imaging lens is provided on the light-emergent surface of the display screen. In this way, the light directly enters the imaging lens after being emitted by the display screen to avoid the propagation of the light in the atmosphere, so as to reduce the optical medium through which the light passes, thereby reducing the reflection of the light and reducing the absorption of the light by the optical medium.

Besides, the second case is that the imaging lens is spaced apart from the display screen. In this way, it is possible to expand the propagation distance of the light, increase the optical path, and enable the light to have a sufficient catadioptric path, thereby enabling the light to be sufficiently enlarged and analyzed for imaging.

Table 1 lists the specific parameters of one embodiment of the imaging module and gives the corresponding coefficients for calculating the optical surface.

TABLE 1

| part | material | surface | thickness/ spacing (mm) | radius of curvature (mm) | 4th aspheric coefficient | 6th aspheric coefficient | 8th aspheric coefficient |
|---|---|---|---|---|---|---|---|
| human eye | / | / | 12 | infinite | / | / | / |
| third lens | EP6000 | light-emergent surface | 3.6 | 169 | −1.25E−05 | 3.42E−08 | −8.53E−10 |
| | | light-incident surface | 0.1 | −77.7 | −2.07E−05 | −5.97E−08 | 1.20E−10 |
| polarization reflector | / | light-emergent surface | 0.08 | infinite | / | / | / |
| | | light-incident surface | 0 | infinite | / | / | / |
| second polarization converter | / | light-emergent surface | 0.08 | infinite | / | / | / |
| | | light-incident surface | 0 | infinite | / | / | / |
| second lens | PMMA | light-emergent surface | 12.0 | infinite | / | / | / |
| | | light-incident surface | 0 | −92.3 | 1.56E−06 | 7.02E−09 | −1.72E−11 |
| first lens | PMMA | light-emergent surface | 2.9 | −92.3 | 1.56E−06 | 7.02E−09 | −1.72E−11 |
| | | light-incident surface | 0 | infinite | / | / | / |
| first polarization converter | / | light-emergent surface | 0.08 | infinite | / | / | / |
| | | light-incident surface | 0 | infinite | / | / | / |
| linear polarizer | / | light-emergent surface | 0.08 | infinite | / | / | / |
| | | light-incident surface | 1.0 | infinite | / | / | / |
| display screen | BK7 | light-emergent surface | 0.5 | infinite | / | / | / |
| | | light-incident surface | 0 | infinite | / | / | / |

Figure 5:
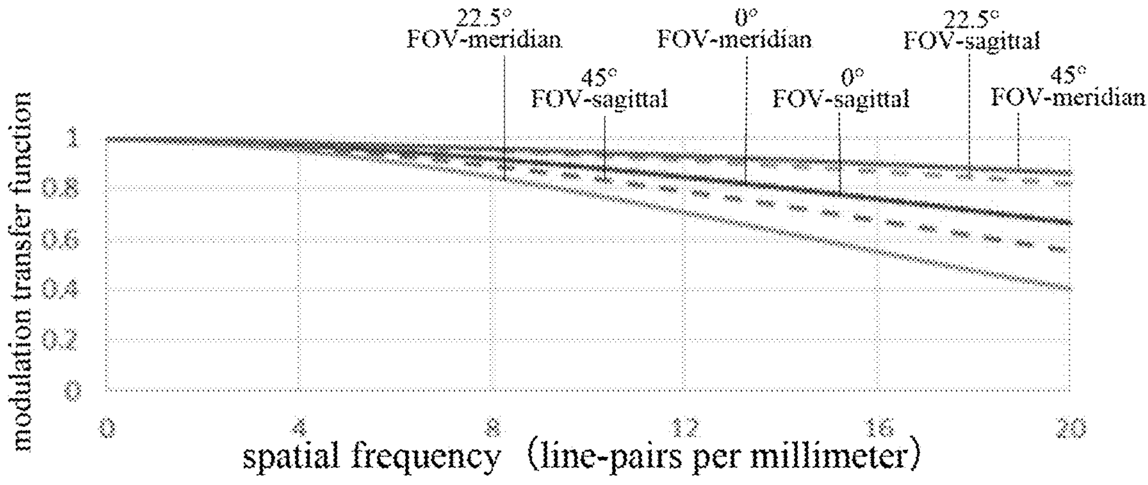
FIG. 5 is a graph of modulation transfer function of the imaging module in FIG. 1 at 450 nm.
Figure 6:
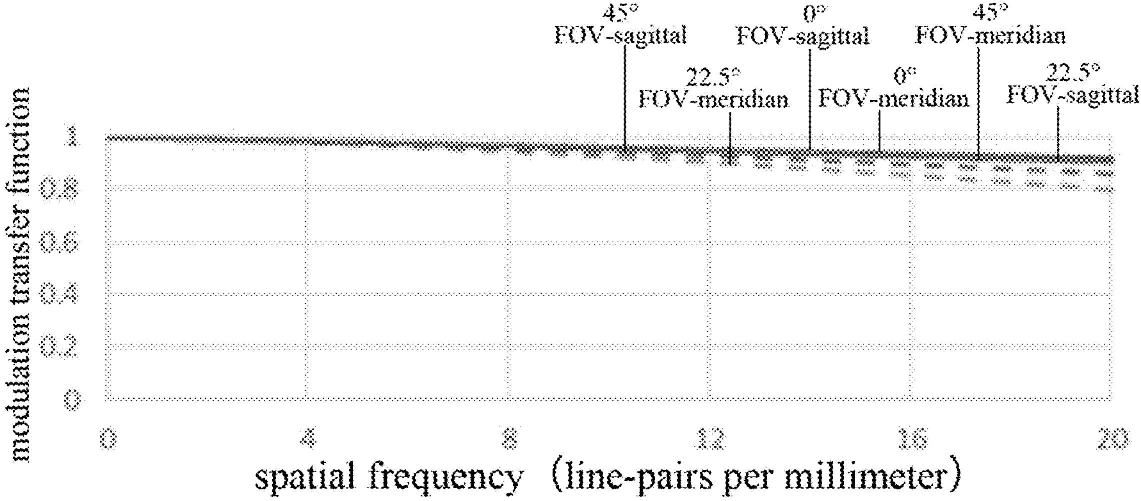
FIG. 6 is a graph of modulation transfer function of the imaging module in FIG. 1 at 540 nm.
Figure 7:
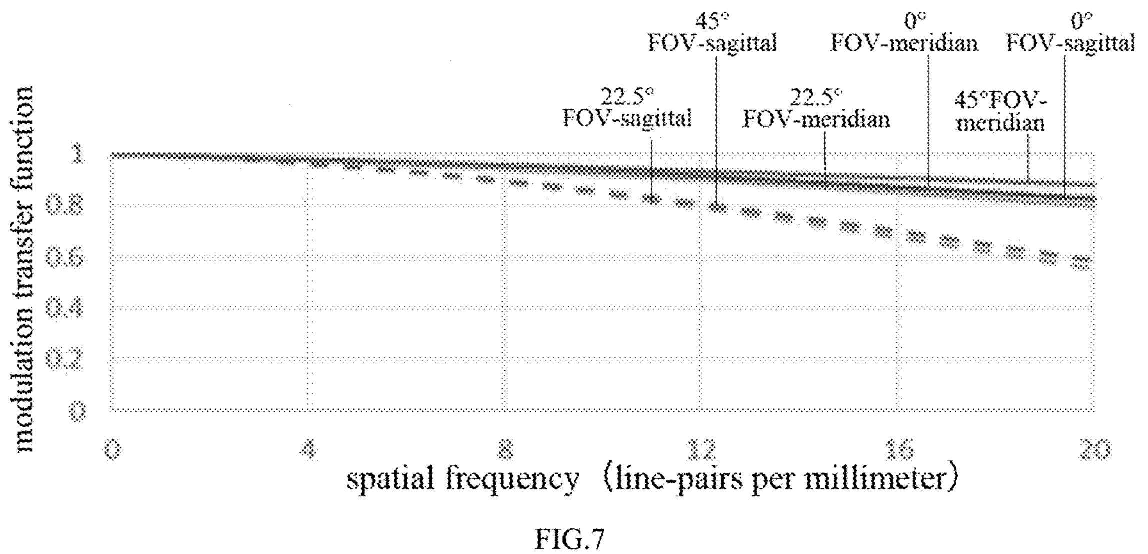
FIG. 7 is a graph of modulation transfer function of the imaging module in FIG. 1 at 610 nm.

In addition, with respect to the above embodiment, FIGS. 5, 6 and 7 show graphs of the modulation transfer function (MTF) of the imaging module in the present embodiment at 450 nm, 540 nm, and 610 nm, respectively, wherein the MTF map is the relationship between the modulation index and the number of line-pairs per millimeter in the image, which is used to evaluate the ability to restore the details of the scene. It can be seen from the figure that at a spatial frequency of 20 of line-pairs per millimeter, the MTF value of the imaging module is higher than 0.40 at a wavelength of 450 nm, the MTF value of the imaging module is higher than 0.75 at a wavelength of 540 nm, and the MTF value of the imaging module is higher than 0.55 at a wavelength of 610 nm.

The above are only the preferred embodiments of the present disclosure, and are not intended to limit the patent scope of the present disclosure. Any equivalent structural transformations made by utilizing the specification of the present disclosure and the accompanying drawings under the concept of the present disclosure or directly/indirectly applying them in other related technical fields are included in the scope of patent protection of the present disclosure.

The invention claimed is:

1. An imaging module, comprising:

a display screen configured for emitting light in a light-emergent direction;

an imaging lens provided in the light-emergent direction; and a first polarization converter provided on the imaging lens; wherein the light emitted by the display screen in different fields of view comprises a chief light centrally located in the light, wherein the chief light passes through a central region of an exit pupil position;

wherein the imaging lens is provided with a light-incident surface to which the light is incident, and a light-emergent surface from which the light is emergent, and the first polarization converter is provided on the light-incident surface or on the light-emergent surface of the imaging lens.

2. The imaging module of claim 1, wherein the chief light emitted by the display screen has an incident angle to a surface of the first polarization converter less than or equal to 5°.

3. The imaging module of claim 1, wherein the chief light comprises a central chief light emitted from a central field of view of the display screen and a marginal chief light emitted from a marginal field of view of the display screen, wherein the central chief light has a first central incident angle $\alpha 1$ to the first polarization converter when the central chief light is emitted to the first polarization converter for the first time, satisfying $\alpha 1=0$; and wherein the marginal chief light has an incident angle $\beta 1$ to the first polarization converter when the marginal chief light is emitted to the first polarization converter for the first time, satisfying $0° \leq \beta 1 \leq 5°$.

4. The imaging module of claim 3, wherein the imaging module further comprises a second polarization converter provided on the light-emergent surface of the imaging lens, the first polarization converter is provided on the light-incident surface of the imaging lens, and both the light-incident surface and the light-emergent surface of the imaging lens are flat surfaces;

wherein the central chief light has an incident angle $\alpha 2$ to the second polarization converter when the central chief light is emitted to the second polarization converter for the first time, satisfying $\alpha 2=0$; and an incident angle of the marginal chief light has an incident angle β2 to the second polarization converter when the marginal chief light is emitted to the second polarization converter for the first time, satisfying $0° \leq \beta 2 \leq 5°$.

5. The imaging module of claim 1, wherein the imaging lens comprises a first lens and a second lens which are sequentially provided along a light propagation direction, are made of the same material, and are glued to each other; the first polarization converter is provided on a light-incident surface of the first lens, and a second polarization converter is provided on a light-emergent surface of the second lens.

6. The imaging module of claim 5, wherein the first polarization converter and the second polarization converter are both phase retarders, and the imaging module further comprises:

a linear polarizer provided on a side of the first polarization converter facing away from the first lens;

a beam-splitter provided between the first lens and the second lens, and a polarization reflector provided on a side of the second polarization converter facing away from the second lens.

7. The imaging module of claim 6, wherein the imaging module further comprises a third polarization converter which is a phase retarder and is provided between the linear polarizer and the display screen.

8. The imaging module of claim 5, wherein the imaging module further comprises a third lens which is a positive lens and is provided on a side of the imaging lens facing away from the display screen; and a direction perpendicular to a direction of an optical axis of the imaging module is defined as a height direction, the imaging module has a height of D1, and the third lens has a height of D2, satisfying: $D2 < D1$.

9. An assembling method for an imaging module of claim 1, wherein the first polarization converter is glued to the imaging lens, and the assembling method comprises:

adjusting a gluing angle of the first polarization converter on the imaging lens so as to determine a gluing position of the first polarization converter when a stray light is at a low ebb; and gluing and fixing the first polarization converter according to the determined gluing position of the first polarization converter.

10. A head mount display, comprising:

a housing; and an imaging module of claim 1, provided within the housing.

* * * * *